3,116,969
CHEMICAL COATING FOR FILTERS

Roy L. Coleman, Jr., Fort Worth, Tex., assignor to Worth Chemical Products Company, Fort Worth, Tex., a corporation of Texas
No Drawing. Filed Mar. 22, 1961, Ser. No. 97,465
19 Claims. (Cl. 21—74)

The present invention relates to air filters and more particularly to an air filter coated with a novel antiseptic composition to effectively remove and destroy airborne bacteria, viruses, and odors.

Almost unlimited numbers of air filters are known which provide various types of complex metal, plastic or paper networks or porous material through which air flows to capture and hold solid particulate matter suspended in the air. However, the removal of other impurities is more difficult, and, in particular, removal and destruction of bacteria, viruses, and odors are not effectively achieved in known filtering equipment.

The removal of such impurities is important, particularly when the filtered air is furnished to buildings in which many people are present. When air is continuously recirculated, as, for example, in a home heated by a warm air furnace or cooled by a corresponding air conditioner, bacteria, viruses, and odors may accumulate. During times of high incidence of respiratory disease it is important to maintain airborne bacteria and virus counts low, to minimize the spread of disease, but conventional dust filters generally have little effect in removing such impurities. In fact, there is always the danger that bacteria trapped on a dust filter will find the accumulated dust, etc., an excellent surface on which to multiply and the resulting increased numbers of bacteria may be carried out by air flowing through the filter.

The present invention provides a novel air filter capable of efficiently removing bacteria, viruses and odors from air and destroying them, in which a novel sterilizing medicine or antiseptic agent is coated on the filtering surfaces of the air filter. The active ingredient is a quaternary ammonium compound which serves the multiple purposes of a bactericide, fungicide, and deodorant. This agent is dispersed in a tacky medium and coated on the filter surfaces. Not only does the filter, thus coated, effectively remove bacteria, but its tackiness increases the effectiveness in the normal function of a filter, which is removing solid particles. The tacky medium is designed to capture the bacteria and to wet airborne particles and substances so that they are drawn into the tacky layer.

The tacky medium comprises water, a hydroscopic agent and a thickener and film former. This specific medium is uniquely adapted for use with quaternary ammonium compounds for efficient removal of impurities.

Suitable compounds for accomplishing the combined effects of bactericide, fungicide and deodorant are quaternary ammonium salts, especially chlorides. A very large number of alkyl aryl quaternary ammonium chlorides can be used for this purpose, but especially useful compounds are diisobutyl phenoxy ethoxy dimethyl benzyl ammonium chloride and methyl dodecyl benzyl trimethyl ammonium chloride. The former, known as Hyamine 1622 is particularly advantageous, since it is 100% active and is almost completely odorless. The quaternary ammonium salts are known to have surface active properties, and this facilitates the wetting of particles and airborne substances and induces their penetration into the coating. Suitably, this agent should be present in an amount of about 2% to about 6% of the total composition.

The hygroscopic agent is a polyhydric alcohol, preferably an aliphatic polyhydric alcohol, which is capable of absorbing moisture from the atmosphere. One suitable polyhydric alcohol is triethylene glycol, which possesses additional advantage in its known beneficial effects in combatting cold germs and related organisms. Another suitable alcohol is glycerol. The amount of hygroscopic agent is about 30% to about 60% of the total composition.

The thickener and film former gives the mixture a tackiness which is essential for coating filters. Since the composition is tacky, it adheres to the surface of a filter and also aids in trapping bacteria and other foreign bodies. The thickener should be non-ionic or cationic in nature for compatibility with the quaternary ammonium salts. Preferred agents for this purpose are polyethers, polymerized aliphatic oxides, usually lower aliphatic oxides such as ethylene or propylene oxides and polymerized alkylene cyclic ethers such as polytetrahydrofuran. The molecular weight can be several thousand to about five million. In addition, various cellulosics such as lower alkyl cellulose ethers including methyl and ethyl cellulose may be used. Viscosities of water solutions of methyl and ethyl cellulose which may be used are from 10 cps. to 10,000 cps. One suitable material is Dow Methocel 4000 HG. Another material which may be used in certain cases is natural gums, although these tend to precipitate. The amount of thickener should be sufficient to give a gummy or substantially rigid tacky composition and usually is about 0.5% to about 3% of the total composition.

It is believed that a synergistic effect is achieved by the above combination, and that the effectiveness of the filter, thus coated, is greater than the cumulative effects of the several ingredients separately.

In addition to the above materials, a wetting, spreading and coupling agent, black strap molasses, an alcohol and an inhibitor may be used. Suitable wetting, spreading and coupling agents are alkyl aryl polyether alcohols (e.g., condensates of alkyl phenols such as octyl phenol and nonyl phenol with ethylene oxide). If used, the amount of this agent is up to about 2% of the total composition.

Any inhibitor may be used which is physically compatible, but one which has been found adequate is a mixture of borax (hydrate) and a solubilizing and chelating agent such as the sodium salt of ethylene diamine tetraacetic acid. Rust and corrosion inhibitors which are compatible may be used, such as silicates, soluble oils and sulfonates when aluminum or steel parts are exposed to the composition. The amount of inhibitor will vary with the efficiency of the materials used. In the case of the preferred materials, borax is used in an amount up to 3% of the total composition with up to 1% of the sodium salt of ethylene diamine tetraacetic acid. Silicates (0.1% to 1%) may be used with borax optionally to increase inhibitor efficiency. Addition of either sodium nitrate or sodium sulfate in amounts of up to 0.1% to 1% is also effective.

The black strap molasses used is a commercial mixture of approximately 50% sucrose and reducing sugars. It serves as a coupler or crystallization preventative. The use of this material renders the film more adhesive and tends to minimize pinholing or rupture of the film. Black strap molasses is used in amounts up to about 3½%.

The alcohol is used particularly when methyl cellulose and related cellulosics are employed as the thickener. It aids in solubilizing and coupling methyl cellulose into the product, and serves as an anti-foam and for improving the odor of the product. Suitable alcohols include denatured ethyl alcohol, and the amount is up to about 25%.

The composition is made by mixing all of the above materials with water, which may have been heated and sufficient agitation should be employed to insure uniform dispersion. The composition is applied to a filter by dipping or spraying and the filter is then ready for immediate use. Some water may evaporate, but it is not necessary to wait for this before use. Almost any type of air filter may be employed so long as it provides surfaces in contact with air flowing through and no limitation is intended thereto.

The following is a representative composition.

*Example I*

| | Pounds |
|---|---|
| Hot water | 50 |
| Screened methyl cellulose, viscosity 4000 cps | 1 |
| Hyamine 1622 | 4 |
| Black strap molasses | 5 |
| Triethylene glycol | 40 |
| | 100 |

The ethylene oxide polymer is added to the water, previously heated to about 90° C. with vigorous agitation. When the addition is complete, the two are mixed for several minutes, then cooled at room temperature. The remaining ingredients are then added.

Other formulas including the optional ingredients are:

*Example II*

| | Parts by weight |
|---|---|
| Polymerized ethylene oxide—Polyox 301 | 1.00 |
| Borax (sodium tetraborate hydrate) | 0.75 |
| Tetrasodium ethylenediamine-tetraacetate | 0.25 |
| A mixed alkyl aryl polyether alcohol | 0.02 |
| Hyamine 1622 (diisobutyl phenoxy ethoxy dimethyl benzyl ammonium chloride) | 5.00 |
| Glycerol | 15.00 |
| Water | 77.50 |
| | 100.00 |

*Example III*

| | Pounds |
|---|---|
| Denatured ethyl alcohol | 5 |
| Methyl cellulose, 4000 cps | 1 |
| Water | 43.8 |
| Nonionic surfactant (wetting, spreading and coupling agent) | 0.2 |
| Borax | 0.8 |
| Sodium ethylenediamine tetraacetate | 0.2 |
| Glycerine | 40 |
| Black strap molasses | 5 |
| Hyamine 1622 (100%) | 4 |
| | 100 |

The following example is an aerosol composition which can be sprayed onto a filter.

*Example IV*

| Aerosol filter coat: | Pounds |
|---|---|
| Denatured alcohol | 24 |
| Nonionic surfactant (wetting, spreading and coupling agent) | 0.2 |
| Methyl cellulose, 4000 cps | 1.0 |
| Water | 9.8 |
| Borax | 0.8 |
| Sodium ethylenediamine tetraacetate | 0.2 |
| Glycerine | 55.0 |
| Black strap molasses | 5.0 |
| Hyamine 1622 | 4.0 |
| | 100.0 |

This composition is mixed with approximately equal parts of a Freon propellant gas.

The pH is maintained on the alkaline side at about 8 in both Examples III and IV.

While preferred embodiments of materials and proportions have been described, various changes and modifications may be made without departing from the scope of the invention as defined in the claims.

What is claimed is:

1. An air filter and a coating on the filtering surfaces of said air filter comprising an antiseptic material dispersed in a tacky medium, said tacky medium comprising water, a hygroscopic agent and a thickener and film former.

2. Apparatus as set forth in claim 1 in which the hygroscopic agent is triethylene glycol.

3. Apparatus as set forth in claim 1 in which the hygroscopic agent is glycerol.

4. Apparatus as set forth in claim 1 in which the thickener is polymerized ethylene oxide.

5. Apparatus as set forth in claim 1 in which the thickener is methyl cellulose.

6. Apparatus as set forth in claim 1 in which the tacky medium includes a wetting, spreading and coupling agent.

7. Apparatus as set forth in claim 1 in which the tacky medium includes a decomposition inhibitor.

8. A coating composition for the filtering surfaces of an air filter comprising a quaternary ammonium salt and a tacky medium in which the tacky medium comprises water, a hygroscopic agent and a thickener and film former.

9. A coating composition as set forth in claim 8 in which the tacky medium includes a wetting, spreading and coupling agent.

10. A coating composition as set forth in claim 9 in which the wetting, spreading and coupling agent is an alkyl aryl polyether alcohol.

11. A coating composition as set forth in claim 8 in which the tacky medium includes a decomposition inhibitor.

12. A coating composition as set forth in claim 11 in which the inhibitor comprises borax and tetrasodium ethylenediaminetetraacetate.

13. A coating composition as set forth in claim 8 in which the thickener and film former comprises polymerized ethylene oxide.

14. A coating composition as set forth in claim 8 in which the hygroscopic agent comprises triethylene glycol.

15. A coating composition as set forth in claim 8 in which the hygroscopic agent comprises glycerol.

16. A coating composition for the filtering surfaces of an air filter comprising water, methyl cellulose, diisobutyl phenoxy ethoxy dimethyl benzyl ammonium chloride, black strap molasses and triethylene glycol.

17. A coating composition for the filtering surfaces of an air filter comprising about 50 parts by weight water, about 1 part by weight methyl cellulose, about 20 parts by weight diisobutyl phenoxy ethoxy dimethyl benzyl ammonium chloride about 5 parts by weight black strap molasses and about 30 parts by weight triethylene glycol.

18. A coating composition for the filtering surfaces of an air filter comprising water, polymerized ethylene oxide, sodium tetraborate, tetrasodium ethylene diaminetetraacetate, an alkyl aryl polyether alcohol, diisobutyl phenoxy ethoxy dimethyl benzyl ammonium chloride and glycerol.

19. A coating composition for the filtering surfaces of an air filter comprising about 77.5 parts by weight water, about 1 part by weight polymerized ethylene oxide, about 0.75 part by weight sodium tetraborate, about 0.25 part by weight tetrasodium ethylenediaminetetraacetate, about 0.5 part by weight alkyl aryl polyether alcohol, about 15 parts by weight diisobutyl phenoxy ethoxy dimethyl benzyl ammonium chloride and about 15 parts by weight glycerol.

References Cited in the file of this patent

UNITED STATES PATENTS

| | | |
|---|---|---|
| 2,347,031 | Cupery | Apr. 18, 1944 |
| 2,544,732 | Schechmeister | Mar. 13, 1951 |
| 2,569,575 | Philips | Oct. 2, 1951 |
| 2,620,044 | Fine et al. | Dec. 2, 1952 |
| 2,638,180 | Herkimer | May 12, 1953 |
| 2,823,183 | Lonstrup | July 22, 1955 |